US011520046B2

(12) United States Patent
Birnbacher et al.

(10) Patent No.: US 11,520,046 B2
(45) Date of Patent: Dec. 6, 2022

(54) METHOD AND DEVICE FOR OPTICAL DISTANCE MEASUREMENT

(71) Applicant: Ibeo Automotive Systems GmbH, Hamburg (DE)

(72) Inventors: Wolfgang Birnbacher, Hamburg (DE); Jan Rühaak, Hamburg (DE)

(73) Assignee: IBEO AUTOMOTIVE SYSTEMS GmbH, Hamburg (DE)

(*) Notice: Subject to any disclaimer, the term of this patent is extended or adjusted under 35 U.S.C. 154(b) by 806 days.

(21) Appl. No.: 16/518,343

(22) Filed: Jul. 22, 2019

(65) Prior Publication Data

US 2020/0025922 A1   Jan. 23, 2020

(30) Foreign Application Priority Data

Jul. 23, 2018  (EP) ...................................... 18184937

(51) Int. Cl.
*G01S 17/10* (2020.01)
*G01S 7/484* (2006.01)
*G01S 7/486* (2020.01)
*G01S 17/931* (2020.01)

(52) U.S. Cl.
CPC .............. *G01S 17/10* (2013.01); *G01S 7/484* (2013.01); *G01S 7/486* (2013.01); *G01S 17/931* (2020.01)

(58) Field of Classification Search
CPC .......... G01S 17/10; G01S 7/484; G01S 7/486; G01S 17/931; G01S 13/227; G01S 7/4861; G01S 7/4865; G01S 17/08
See application file for complete search history.

(56) References Cited

U.S. PATENT DOCUMENTS

2016/0291138 A1* 10/2016 Drader .................. G01S 7/4863

FOREIGN PATENT DOCUMENTS

DE   10 2013 002 651 A1   8/2014
WO       2006/063740 A1   6/2006

OTHER PUBLICATIONS

Search Report issued for corresponding European Patent Application No. EP 18 18 4937, dated Jan. 25, 2019, with an English machine translation.

* cited by examiner

*Primary Examiner* — James C. Jones
(74) *Attorney, Agent, or Firm* — Myers Wolin, LLC (57) ABSTRACT

A method for optical distance measurement is provided, which comprises emitting a plurality of measurement pulses, reflecting emitted measurement pulses on at least one object within a measurement range with a length and receiving reflected measurement pulses. N subsets of measurement pulses are emitted, wherein each subset comprises a constant pulse interval. The constant pulse interval of different subsets is different, wherein the least common multiple of the constant pulse intervals of the N subsets corresponds to at least twice the length of the measurement range.

15 Claims, 5 Drawing Sheets

METHOD AND DEVICE FOR OPTICAL DISTANCE MEASUREMENT

CROSS REFERENCE TO RELATED APPLICATIONS

This application takes priority from European Application No. 18184937.3 filed on Jul. 23, 2018, the contents of which are incorporated by reference herein.

TECHNICAL FIELD

The invention relates to a method as well as a device for optical distance measurement.

BACKGROUND

Optical distance measurements, in particular, for use in the unmanned navigation of vehicles, are known from the most recent background art. They are based on the time-of-flight principle, wherein a scanning sensor is used, in particular, a LIDAR (abbreviation for "Light Detection and Ranging") sensor, which emits periodic measurement pulses, which are reflected on objects, wherein the reflected measurement pulses are detected. With the determination of the delay time of the measurement pulses from the sensor to the objects and back again and the velocity of light, the distance to these objects can be determined.

However, a considerable disadvantage in the case of the prior art of known methods is, that the measurement pulses cannot be successively emitted at any speed because then no clear association of reflection is possible.

If the measurement pulses are emitted too quickly, aliasing effects are created. This means that the method not only recognizes an object at the correct actual object position, but the object is also detected at incorrect object positions as so-called ghost objects based on the incorrect association of emitted measurement pulses and reflected measurement pulses.

Furthermore, the time delay of the measurement pulse, meaning the time the measurement pulse needs until it reaches the sensor cannot be shortened since the measurement pulses move at the speed of light. In order to scan a distance range that is located far away, after emitting a measurement pulse, it is necessary to wait twice the time delay up to the possible object position located the furthest away until another measurement pulse can be emitted again.

As a result, the number of measurements per unit of time is strongly limited since twice the time delay between the device carrying out a measurement process and the maximum possible object position has to be waited.

SUMMARY

An object of the invention is to improve a method as well as a device for distance measurement in such a way that, in comparison with prior art, measurement pulses can be emitted at smaller intervals than twice the time delay up to a possible maximally distanced object position, nevertheless the actual object position can be clearly and correctly determined. In other words, measurement pulses should be emitted at smaller intervals, wherein aliasing effects should be ruled out.

The above-mentioned task is achieved by means of the method for optical distance measurement. The method comprises emitting a plurality of measurement pulses, reflecting the emitted measurement pulses on at least one object within a measurement range and receiving reflected measurement pulses. The measurement range has a length.

The measurement pulse reflected by the object is a measurement pulse, which was previously emitted so that its propagation direction has changed by having been reflected on the object. Thereby, the reflected measurement pulse can be understood as an echo of the emitted measurement pulse. In particular, by means of the method, the time delay of the measurement pulses travelling to the objects, on which they are reflected, is detected and, from this, with the help of the velocity of light, the distance the respective measurement pulse has travelled to the object is determined.

An optical distance measurement is characterized in that, with the use of optical signals, here optical measurement pulses distances are determined. The distance travelled by the measurement pulse is understood as the path between a transmitting unit which emitted the measurement pulse and the object that reflected this, plus the path between the object and the receiving unit that received the correspondingly reflected measurement pulse. In particular, the method comprises taking the exact position of the transmission element and the receiving unit under consideration, in particular, in relation to each other.

Since the at least one object typically is a three-dimensional object in such a way that several regions of the object can be arranged closer and other regions of the object can be arranged further away, with the term "distance away from the object", the distance from at least one point of the object is intended and that being the point where the measurement pulse hit and on which this was reflected. Time delay is understood as the time that the measurement pulse required for the previously described distance. The method, above all, is used for distance measurement for application in the field of unmanned vehicle navigation.

In particular, a measurement pulse is an optical signal, preferably, an electromagnetic signal. The measurement pulse preferably has a wavelength, which does not originate in the visible range of the human eye. Preferably, invisible infrared is used for security reasons. Preferably, a measurement pulse comprises a pulse width so that the measurement pulse can be understood as a time-limited portion of electromagnetic radiation. Since a measurement pulse is an electromagnetic signal and, thereby, the speed of the measurement pulse is known, by means of the velocity of light, it can be concluded from the time delay of a measurement pulse what path the measurement pulse has travelled during the time delay.

N subsets of measurement pulses are emitted, wherein the letter N stands for a natural number. In particular, at least two, preferably at least three and most preferred at least four subsets of measurement pulses are emitted. Each subset comprises a constant pulse interval. The term "pulse interval" means the spatial distance of adjacent measurement pulses of the same subset at the same point in time. This naturally allows for conclusions concerning the time interval to be made since the speed of the pulses is identical and constant. By means of the fact that each subset comprises a constant pulse interval, all adjacent measurement pulses of the subset are the same distance apart on a spatial level as well as on a temporal level.

The constant pulse intervals of different subsets differ from one another. Therefore, each subset can be clearly differentiated from the other subset by means of the pulse interval of adjacent measurement pulses of the subset.

The least common multiple of constant pulse intervals of the N subsets corresponds to at least twice the length of the measurement range. That means that the least common multiple of constant pulse intervals is larger than or equal to the length of the measurement range times two.

The constant pulse intervals are typically determined by indicating a number and a measurement unit. In particular, the number is a natural number. There, in particular, the measurement unit is specified by the spatial distance between two adjacent pulses of a subset. Therefore, each subset is clearly determined by a number that defines the constant pulse interval.

When determining the least common multiple of the constant pulse intervals, only the corresponding numbers are taken into account while the measurement units are left out. However, beforehand, it is ensured that the constant pulse intervals are indicated in the same measurement unit since this naturally has an influence on the corresponding numbers. For example, a first subset has a constant pulse interval of 2 distance units while a second subset has a constant pulse interval of 3 distance units. The least common multiple here is 6, i.e. with a measurement unit, 6 distance units. Also, before a comparison with the double of the length of the measurement range, it must be previously ensured that the doubled length is indicated in the same measurement unit as the constant pulse intervals.

Instead of selecting subsets with different constant pulse intervals, the method can also be understood in such a way that the doubled time delay must always elapse to run through the length of a measurement range, wherein, in the case of the subsets, the measurement range length is artificially hypothetically shortened to obtain shorter constant pulse intervals. In other words, a partial distance of the length of the measurement range can be associated with each subset, wherein a new measurement pulse is emitted after running through the doubled partial distance. The partial distance thereby corresponds to half the respective constant pulse interval. The least common multiple of these partial distances is greater than or equal to the length of the measurement range.

Preferably, the constant pulse intervals are less than twice the length of the measurement range. For the comparison, the constant pulse intervals and the doubled length of the measurement range are indicated in the same measurement unit. In other words, a time delay can be associated with the doubled length of the measurement range. The time delay particularly corresponds to precisely the time delay that a measurement pulse requires for travelling the doubled length of the measurement range. By means of the fact that the speed of the measurement pulses is clearly defined by the velocity of light and the length of the measurement range is set, the time delay is also clearly determined. The constant temporal pulse intervals of the subsets are therefore smaller than the time delay. Thereby, measurement pulses are deliberately emitted considerably closer together than is the case in prior art, wherein, simultaneously, due to the feature that the least common multiple of the constant pulse intervals of the N subsets corresponds to at least twice the length of the measurement range, it is ruled out that an ambiguity with regard to the object position results.

By the term "measurement range", in particular, a three-dimensional area is intended, from which reflections of the emitted measurement pulses can and/or should be received. In other words, an area to be measured is to be understood by the term. The measurement range does not have to be technical in nature, but can be deliberately selected. Thereby, it is a range, which should be "measured" by means of a method according to the invention, in other words, scanned. The measurement range is defined by a field of view and a distance range. The distance range preferably extends in the radiation propagation direction starting from a device for distance measurement, and that along the aforementioned length.

The field of view can be spanned into two planes by two angle sectors that are perpendicular to one another. On one of these planes, i.e. two-dimensional, the field of view can be understood as an angular sector, i.e. a circular sector without being limited by a circular arc. In other words, the angular sector is limited only by two circular radii starting from the device. Three-dimensionally, the field of view forms a pyramid extending into the infinite in the radiation propagation direction. Due to the limited length, the height of this infinitely long pyramid is limited so that the measurement range is formed. The base, i.e. the base surface, of the pyramid is preferably curved or level.

The length extends from a beginning range of the measurement range in the radiation propagation direction up to an end range of the measurement range. If the measurement range starts directly at the device, the beginning range is there while the end range is located at a distance from the device, which corresponds to the length. As an alternative, the measurement range can be arranged at a distance from the device. This means that the beginning range is also arranged at a distance from the device in the radiation propagation direction. In such a case, the measurement range has the shape of a truncated pyramid, with a preferably curved or level base surface and a preferably curved or level cover surface.

Since the device for carrying out the method preferably comprises a transmitting unit, in particular, a transmission matrix, the measurement range can also have the shape of a truncated pyramid at its beginning range (also in the case that the measurement range starts directly at the device), wherein the cover surface is formed by a transmitting surface of the transmitting unit of the device.

Preferably, the measurement range can comprise a plurality of lengths that all extend from the beginning range of the measurement range to the end range. The least common multiple of the constant pulse intervals is at least as great as twice one of these lengths. Preferably, this applies to all lengths. In particular, all mentioned comparisons with a double length or a single length of the measurement range apply to all lengths of the measurement range.

Preferably, the method comprises determining possible object positions for each reflected measurement pulse, as well is an accumulation of all possible object positions in a histogram. Thereby, possible object positions are determined for each reflected measurement pulse. Possible object positions arise, in particular, by associating the reflected measurement pulse with emitted measurement pulses. Thereby, for each reflected measurement pulse, it is determined which emitted measurement pulse this can be associated with. Since the position of the object is not known, a series of possibilities results, which respectively result in a possible object position. By the term "object position", in particular, an object distance, i.e. the distance between a device for carrying out the method and an object, is understood.

Thereby, for each reflected measurement pulse, it is determined which emitted measurement pulse this reflected measurement pulse can be associated with. Since the constant pulse intervals are respectively smaller than the time delay which can be associated with twice the length of the measurement range, a plurality of emitted measurement pulses can be associated with each measurement pulse. Thereby, a multitude of possible time delays result, which the reflected measurement pulse can have travelled, depending on which measurement pulse it is associated with.

On the basis of the determined time delays, preferably, possible object positions of the object, at which the measurement pulse was reflected, are determined. These possible object positions are preferably accumulated in a histogram. Preferably, all possible object positions of all measurement pulses of the N subsets are accumulated within a single histogram. Furthermore, a (partial) histogram for each subset can be created.

The histogram comprises an X-axis, which determines the object position. In other words, the position on the X-axis is displayed from a beginning of the measurement range to one end of the measurement range. The distance between the beginning and end corresponds to the length of the measurement range. On the Y-axis, the possible object positions are entered, which were previously determined for each reflected measurement pulse. Each possible object position is entered as an "event" in the histogram. In other words, the method is a time-of-flight measurement with event-based histogram formation. In particular, the method for optical distance measurement is a time-correlated single photon count (abbreviation: TCSPC distance measurement). This means that, in many integration runs, a histogram is filled with events. Thereby, an event is a possible object position of a received measurement pulse. The quality of the measurement is increased in particular as more measurements are made.

Being furthermore preferred, all possible object positions of all measurements of all subsets are shown in a histogram. This can be done by merging the individual histograms of the different subsets by adding them up. Favourably, from the very beginning, an individual histogram comprising all possible object positions of all subsets can be created.

Due to the fact that the least common multiple of the constant pulse intervals of the N subsets corresponds to at least twice the length of the measurement range, it is achieved that, after carrying out the method and thereby carrying out the accumulation of a possible object position for each reflected measurement pulse of the N subsets of measurement pulses in a single histogram, a maximum of the histogram only results at the actual object position. Incorrect object positions, which result in an incorrect association of the reflected measurement pulse and the emitted measurement pulse, are also entered in the histogram, and may also add up if applicable, but their peaks will never reach the height of the maximums at the actual object position. In other words, at the actual object location in the histogram, at least one event more will always be registered than at other possible object locations that do not correspond to the actual object position.

Altogether, in the case of a method according to the invention, it cannot be ruled out that events at the "incorrect" possible object positions are also created due to aliasing effects. However, by means of the invention, it is prevented that the same number of events adds up at the incorrect object position like on the actual object position so that a clear reconstruction of the actual object position is always possible. By means of the fact that measurement pulses can furthermore be emitted with a considerably small distance to one another, during a specified time, considerably more measurements can be carried out than in prior art (if a certain time is set), which increases the quality of the method. Furthermore, the method can be completed in a significantly reduced time (if a certain quality is specified).

As described above, a partial distance can be associated with a subset with a constant pulse interval, said partial distance preferably being smaller than twice the length of the measurement range. Here, the relation between the constant pulse interval and the partial distance comprises here that the partial distance corresponds to half of the constant pulse interval. Mathematically, a measurement with a subset with a partial distance corresponds to a distance measurement modulo M, wherein M represents the length of the measurement range. This means that the distance to an object, on which a reflection took place is not absolutely determined, but is determined only as a residual class group modulo M plus the fractional portion.

Thereby a residual class group $\mathbb{Z}_n$ is defined as follows: If $n \geq 1$ is a natural number, then, integers with the same remainder when dividing by n are combined into so-called residual class group, modulo n. Two integers are therefore in the same residual class group if their difference is divisible by n. The residual class group modulo 2 results by dividing integers by 2 with the remainder, wherein the remainder is either 0 or 1. Thus, $\mathbb{Z}_2$ is equal to $\{0, 1\}$. The residual class groups are cyclical groups in particular. The assignment particular is a canonical assignment.

As an example, M is equal to 24 m and the first partial distance is 6 m and the second partial distance is 8 m. This would correspond to a first constant pulse interval of 12 m and a second constant pulse interval of 16 m. The least common multiple of the corresponding partial distances is 24. The least common multiple of constant pulse intervals is 48, which corresponds to twice the length of the measurement range. The requirements for a clear reconstruction of the actual object distance are therefore fulfilled.

The elements of the residual class groups result as follows:

| Element of the group $\mathbb{Z}_{24}$ | Element pair consisting of $\mathbb{Z}_6$ and $\mathbb{Z}_8$ |
|---|---|
| [0] | ([0], [0]) |
| [1] | ([1], [1]) |
| [2] | ([2], [2]) |
| [3] | ([3], [3]) |
| [4] | ([4], [4]) |
| [5] | ([5], [5]) |
| [6] | ([0], [6]) |
| [7] | ([1], [7]) |
| [8] | ([2], [0]) |
| [9] | ([3], [1]) |
| [10] | ([4], [2]) |
| [11] | ([5], [3]) |
| [12] | ([0], [4]) |
| [13] | ([1], [5]) |
| [14] | ([2], [6]) |
| [15] | ([3], [7]) |
| [16] | ([4], [0]) |
| [17] | ([5], [1]) |
| [18] | ([0], [2]) |
| [19] | ([1], [3]) |
| [20] | ([2], [4]) |
| [21] | ([3], [5]) |
| [22] | ([4], [6]) |
| [23] | ([5], [7]) |

For example, an object is located at a distance of 17.42 m. The measurements with regard to the first and the second subset result in the possible following object positions:

First subset: 5.42 in; 11.42 m; 17.42 m; 23.42 m

Second subset: 1.42 m; 9.42 m; 17.42 m

The only distance, which is plausible with regard to both subsets, is the correct distance of 17.42 m. since it occurs as a possible object position with reference to both subsets.

From the example, it is also evident that it is not detrimental if an actual object position is located at a distance, which does not correspond to an integer, but to a rational number, meaning a number, which comprises an integer part and a non-integer part. The incorrect ghost objects also result in positions that have the same non-integer part. Thereby, the non-integer part can be ignored in order to initially determine the integer part, wherein, then, in order to determine the actual object position, the initially ignored non-integer part is added again.

Preferably, the method comprises extracting the actual object position from the histogram. In particular, the step comprises determining the maximum of the histogram. The histogram can furthermore comprise further secondary maxima that are not so highly pronounced, wherein the step of extracting the actual object position can include suppressing the secondary maximum, for example as noise.

Preferably, the least common multiple for all pairs of constant pulse intervals of the N subsets corresponds to at least twice the length of the measurement range. In other words, different pairs of constant pulse intervals of the constant pulse intervals of the N subsets, which comprises exactly N members, can be formed from the group of constant pulse intervals of the N subsets. For each of these pairs, a least common multiple can be determined, wherein, for all these least common multiples, it applies that these at least correspond to twice the length of the measurement range.

This has the advantage that only one main maximum is created in the received histogram. In comparison, any secondary maxima have only the height of a single event and can therefore be clearly distinguished from the main maximum. Furthermore, the secondary maxima can be declared and thereby, the main maximum and the actual object position can be easily extracted from the histogram. The main maximum has the N-fold height.

In particular, the constant pulse intervals of the N subsets are coprime. As an alternative, the constant pulse intervals of the N subsets cannot be coprime. Furthermore, the partial distances assigned to the constant pulse intervals are coprime or not coprime. The partial distance thereby corresponds to half of the respective constant pulse interval.

In particular, the measurement range is a maximum measurement range or a subrange of the maximum measurement range, above all, a focus range.

In particular, the maximum measurement range defines the spatial area from which reflections can be received by a device for carrying out the method. By the term "maximum measurement range", in particular, a three-dimensional area is intended, from which reflections of the emitted measurement pulses can be received and, preferably, a device, with the aid of which the method for optical distance measurement is carried out, can carry out measurements within the maximum measurement range.

The term subrange of the maximum measurement range refers to a spatially smaller area than the maximum measurement range. For example, a focus range can be understood by this. A focus range defines an area, from which essential information on driverless navigation should originate by means of measurement.

In particular, starting from a device, the measurement range can extend around its length for carrying out the method. The beginning range of the measurement range would thereby be at the device while its end range is distanced away from the device by the length of the measurement range. In other words, the length therefore defines the distance range of the measurement range. However, the measurement range can also initially be at a certain distance from the device and extends from here (leading away from the device) about its length. In the case of the measurement of such a measurement range, measurement pulses, which have been reflected outside of the measurement range, for example, can be deliberately hidden by means of the precisely timed inactivation of the receiving units of the device.

The length of the measurement range is a maximum of 1000 m, preferably a maximum of 800 m, being mostly preferred a maximum of 600 m. The length of the measurement range is furthermore at least 1 m, being furthermore preferred at least 5 m, being mostly preferred at least 20 m.

The product of for each pair of the constant pulse intervals is favourably at least twice the length of the measurement range. Thereby, the product for each pair of constant pulse intervals (without corresponding measurement units) is compared with double the length of the measurement range (also without corresponding measurement units), wherein the constant pulse intervals and the doubled measurement range length must be in the same measurement unit prior to leaving out the measurement units. In the case of the product for each pair of the constant pulse intervals, it is to be understood that each arbitrarily formed pair of two of the group of constant pulse intervals is multiplied, wherein the product corresponds to at least two times the length of the measurement range.

In the case of using more than two constant pulse intervals where the condition is fulfilled that the product for each pair of constant pulse intervals is favourably at least twice the length of the measurement range, it is particularly favourable if the constant pulse intervals is additionally coprime or the least common multiple for all pairs of the constant pulse intervals of the N subsets corresponds to at least twice the length of the measurement range. Then, only one main maximum for the actual object distance is created in the received histogram. In comparison, any secondary maxima have only the height of a single event and can therefore be clearly distinguished from the main maximum. The main maximum has N-fold height. Furthermore, the secondary maxima can be declared and thereby, the main maximum and the actual object position can be easily extracted from the histogram. A reconstruction of the actual object distance is therefore particularly easy.

In particular, the product of all constant pulse intervals is at least twice the length of the measurement range.

In particular, the measurement pulses each have a pulse width, wherein the constant pulse intervals are selected in such a way that every constant pulse interval corresponds to a multiple of the pulse width. This ensures that there can be no partial overlap of measurement pulses, which would make it difficult to clearly reconstruct the actual object position. Furthermore, the design ensures that all measurements with respect to the constant pulse intervals or the assigned partial distances of the measurement range length can also actually be carried out.

In particular, the multiple is selected, preferably taking technical parameters of a device under consideration, to carry out the method. A transmitting unit, especially a laser, is characterized by a minimum intermission delay $t_B$, which must be upheld between two successive measurement pulses, as well as the pulse width $t_P$, here also called elemental interval, i.e. the time during which the device emits the measurement pulse. The minimum intermission time is given on the one hand by the technical design of the device, on the other hand, for a reliable continuous operation, usually larger intermissions have to be chosen, for example to avoid overheating. In order to have some safety buffer, preferably $t_B = 2t_P$ is chosen.

It preferably applies to the constant pulse intervals that these correspond to a multiple of the pulse width, wherein n is larger than or equal to 2, i.e. $nt_P$, $n \geq 2$.

Given M is a maximum distance. First, we determine the number of elementary intervals that must be waited for in the prior art between two measurement pulses in order to ensure a clear reconstruction of object positions up to M. For this, $t_M$ is the time that light needs to travel the distance M. Since the next measurement pulse in the conventional approach can only be sent out when the echo of an intended object positioned exactly at the maximum distance M has returned, the following must apply:

$$kt_P \geq 2t_M$$

for $k \in N$.

Taking the intermission of $2t_P$, which results in a pulse emittance for each time interval of the length $3t_P$, we define the minimum sought after k with the above characteristic at $$K := \min\left\{k: k \geq \frac{2 t_M}{t_P}, k \geq 3\right\}.$$

This minimal K preferably describes the factor according to which the choice of constant pulse intervals is based on.

In the case of a measurement from prior art, between two measurement pulses, a delay is waited in order to ensure a clear reconstruction of the actual object position. This delay corresponds to the time $2t_M$, wherein $t_M$ is the time that the measurement pulse needs to travel the distance M. The time $2t_M$ is the time that the echo of an intended object, which is positioned precisely on the end of the length M of the measurement range, would need.

In the case of a method according to the invention, the constant pulse intervals can be associated with the partial distances of the length of the measurement range. These partial distances are given by $d_1, \ldots, d_N$. The emittance of various subsets of constant pulse intervals change the number of emitted measurement pulses by a factor F, which results as follows:

$$F = \frac{NK}{\sum_{i=1}^{N} d_i}$$

This means that F times as many measurement pulses, for example per time interval $2t_M$, in which normally only one measurement pulse would be emitted, could be emitted.

The constant pulse intervals are favourably not only selected in such a way that the number of measurement pulses per time unit are maximized, but, simultaneously, doubled or higher secondary maxima in the accumulated histogram are avoided. It is therefore desirable that the constant pulse intervals are selected in such a way that not only the actual object distance can be clearly reconstructed, but also no other multiple overlaps occur in the histogram, wherein, by a multiple overlapping, it is intended that several events add up at a potentially incorrect object position. This makes it much easier to distinguish the actual object position from the incorrect object positions.

Being particularly preferred, the constant pulse intervals are therefore selected in such a way that the above F occurs under the condition that no multiple secondary maxima can occur.

In another aspect, the invention may comprise a device that is designed to carry out a method described above. The device is, in particular a LIDAR sensor, which comprises a transmitting unit, above all, a transmission matrix, for emitting measurement pulses and a receiving unit, preferably a receiving matrix, for receiving reflected measurement pulses. By the term transmission matrix, in particular an array of transmitting elements is understood while a receiving matrix can be an array of receiving elements. A matrix can, in particular, be understood as a three-dimensional, more preferably a plate-shaped body, on a surface of which the corresponding elements, transmission elements or receiving elements, are arranged. Preferably, in the case of the transmission elements, each is a laser so that the transmission matrix can be understood as a laser array. These receiving elements are, above all, formed by diodes, in particular avalanche photodiodes, being mostly preferred single avalanche diodes or pindiodes.

Furthermore, the present invention may relate to a computer program product, which comprises a computer-readable storage medium, on which a program is saved, which makes it possible for a computer to carry out an above-mentioned method after it has been loaded into the storage system of the computer, if applicable, in interaction with an above-mentioned device. Furthermore, the invention may relate to a computer-readable storage medium, on which a program is saved, which makes it possible for a computer to carry out an above-mentioned method after it has been loaded into the storage system of the computer, if applicable, in interaction with an above-mentioned device.

DETAILED DESCRIPTION OF PREFERRED EMBODIMENTS

Figure 1:
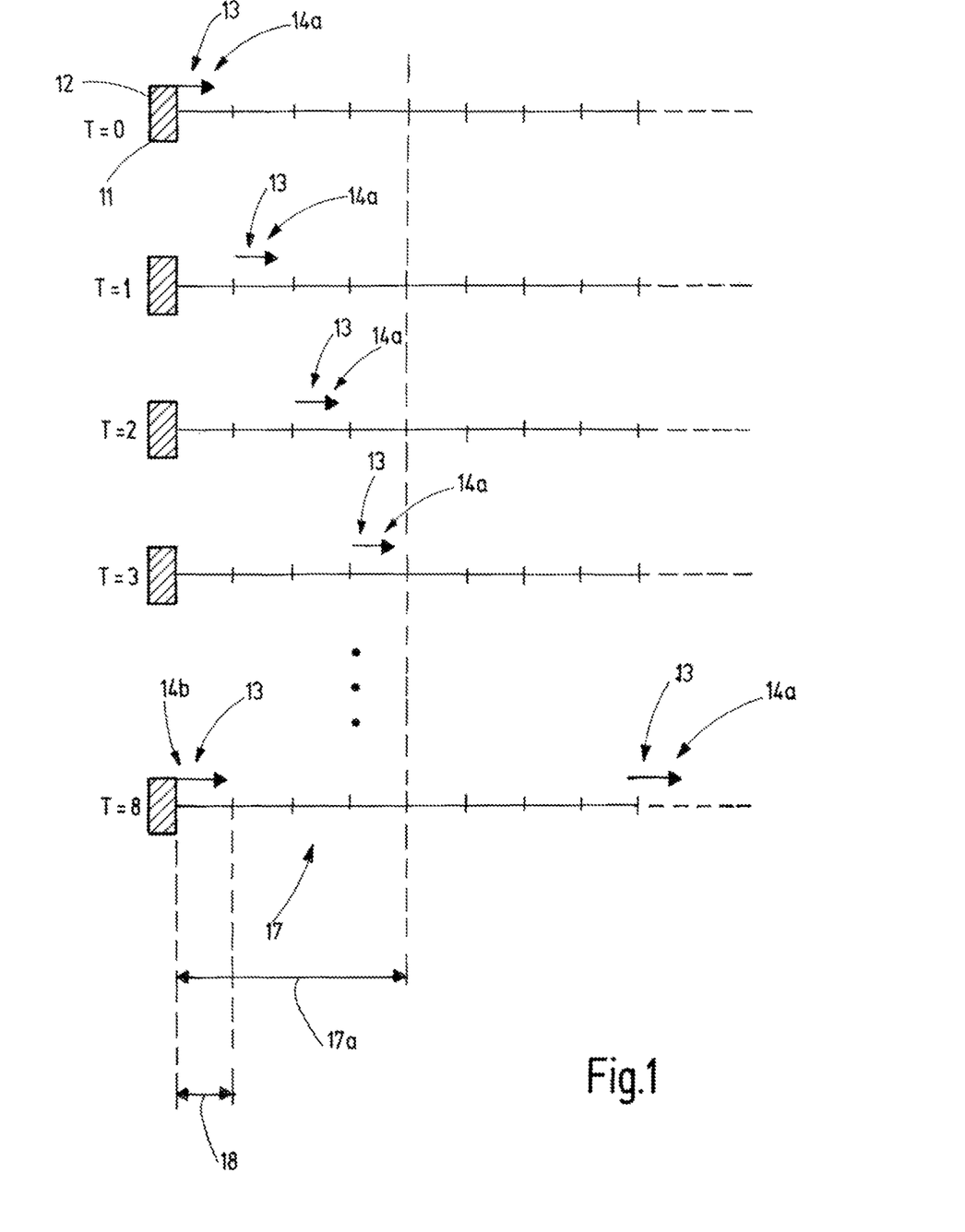
FIG. 1: a time progression of a method from prior art.

FIG. 1 shows time progression of a method for distance measurement from prior art. A total of five different points in time of the method are shown in detail. The different points in time are marked on the left side with T=0, T=1, T=2, T=3 and T=8. For each point in time, a device can be seen that is designed to emit measurement pulses by means of a transmitting unit (12) and to receive measurement pulses by means of a receiving unit (11). Starting from this device on the left, a measurement range (17) starts with a length (17a).

In this process, an emitted measurement pulse travels exactly one distance unit (18) within a time unit. The length (17a) of the measurement range (17) is exactly four distance units (18). Distances between two measurement pulses or one measurement pulse and an object or the device are thereby shown in FIG. 1 with relation to distance units, wherein, naturally, their time interval can be easily concluded from these. If, for example, two measurement pulses are shown two distance units apart in FIG. 1, they have a time interval of two time units.

The device emits a first measurement pulse (14a) at the point in time T=0. Thus, the first measurement pulse emitted (14a) is at the point in time T=1, one distance unit (18) away from the device, while at the point in time T=2 it has distanced itself by two distance units (18) and at the point in time T=3 by three distance units (18) from the device.

After four time units, i.e. at T=4 (not explicitly shown for space reasons), the first measurement pulse (14a) has reached the end of the measurement range (17). At the point in time T=8, i.e. after eight units after emitting, the first emitted measurement pulse (14a) is moved away from the device by eight distance units (18). This corresponds to twice the length (17a) of the measurement range (17).

In prior art, it is usual to wait the time that a measurement pulse (13) would need to move to the end of the measurement range (17) and, from there, back to the device again. This corresponds to the time that a measurement pulse (13) requires in order to return to the device as a reflected measurement pulse if it has been reflected exactly on the end of the measurement range (17). In the case that the measurement range (17) connects directly to the device, this is the time that the measurement pulse (13) would need for twice the length (17a) of the measurement range (17).

In the example of FIG. 1, the time you would wait corresponds to 8 units of time. Therefore, a second measurement pulse, here, a second emitted measurement pulse (14b), is emitted at the point in time, T=8. In this way, an uncertainty is avoided concerning which emitted measurement pulse the reflection of the first emitted measurement pulses (14a) should be associated with. In prior art, this method should ensure that a clear association between a reflected measurement pulse and an emitted measurement pulse can always take place, thereby being able to clearly determine where an object is located, on which the measurement pulse (13) has been reflected.

However, problems can occur in prior art. In the case of the method from prior art, for example, the problem can result that, in the case of reflecting a measurement pulse (13) outside of the length (17a) of the measurement range (17), this could still be incorrectly associated due to error. For example, this reflected measurement pulse could be associated with the subsequent emitted measurement pulse.

Explained by the example of FIG. 1, the measurement pulse (14a) could have been reflected on an object after five distance units (18), i.e. outside the measurement range (17). The prior art method would incorrectly associate this reflection with the second emitted measurement pulse (14b) and would conclude that the object was a distance unit (18) away from the device, which is incorrect. This means that even with the long waiting times between the emitting of two measurement pulses from prior art, complications due to an incorrect association of reflected and emitted measurement pulses can result.

Figure 2:
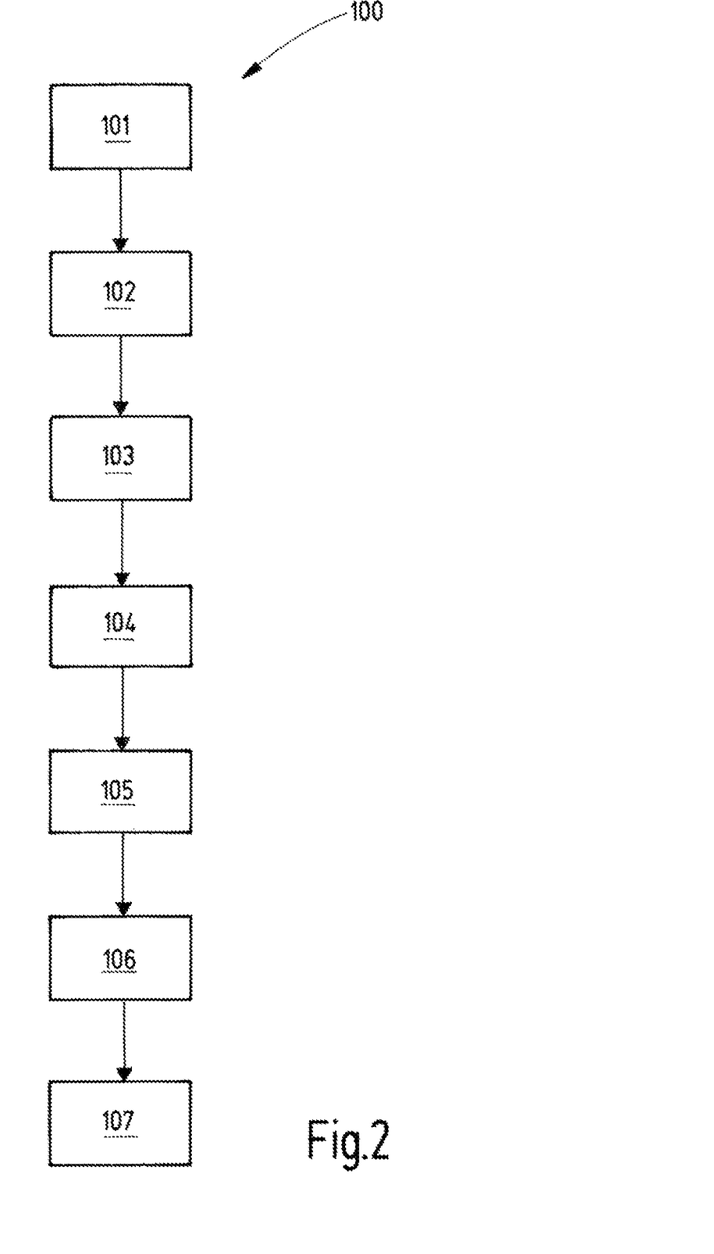
FIG. 2: a process diagram of a method according to the invention.
Figure 5:
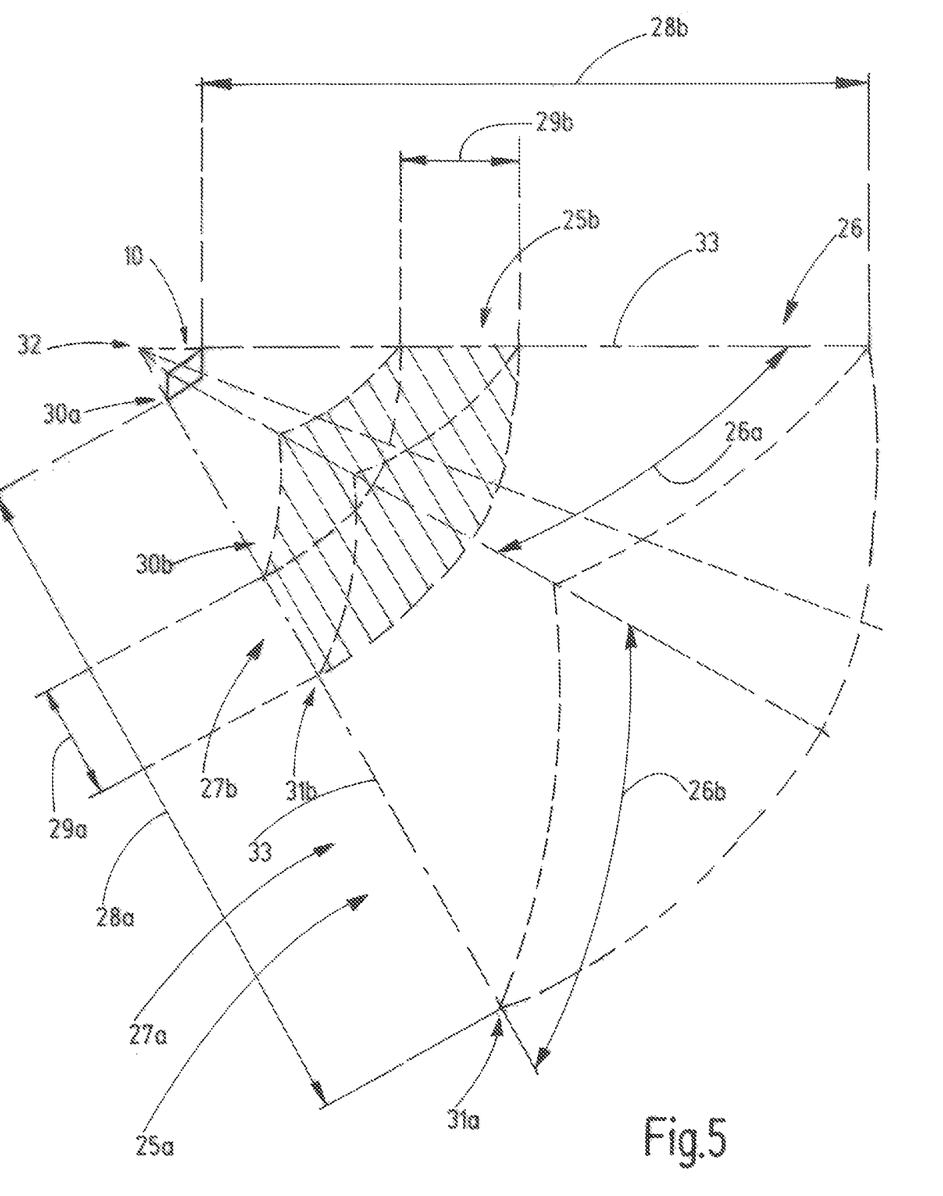
FIG. 5: a perspective view of two measurement ranges.

A process diagram of a method according to the invention (100) is shown in FIG. 2. The method (100) comprises emitting (101) a plurality of measurement pulses (13). In detail, N subsets of measurement pulses (13) are emitted (102). Emitted measurement pulses are reflected (103) on at least one object (20), wherein the reflected measurement pulses are received (104). Not every measurement pulse emitted needs to be reflected, this only applies for measurement pulses that hit an object (20). Preferably, a method according to the invention (100) is carried out by means of a device according to the invention (10). In particular, this device (10) comprises a receiving unit (11) and a transmitting unit (12) (FIG. 5).

Furthermore, the method (100) comprises determining (105) possible object positions (23) for each reflected measurement pulse. In particular, all possible object positions (23) are accumulated (106) in a histogram (21), wherein the actual object position (24) of an object (20), on which measurement pulses (13) have been reflected, is extracted (107) from this histogram (21).

Figure 3:
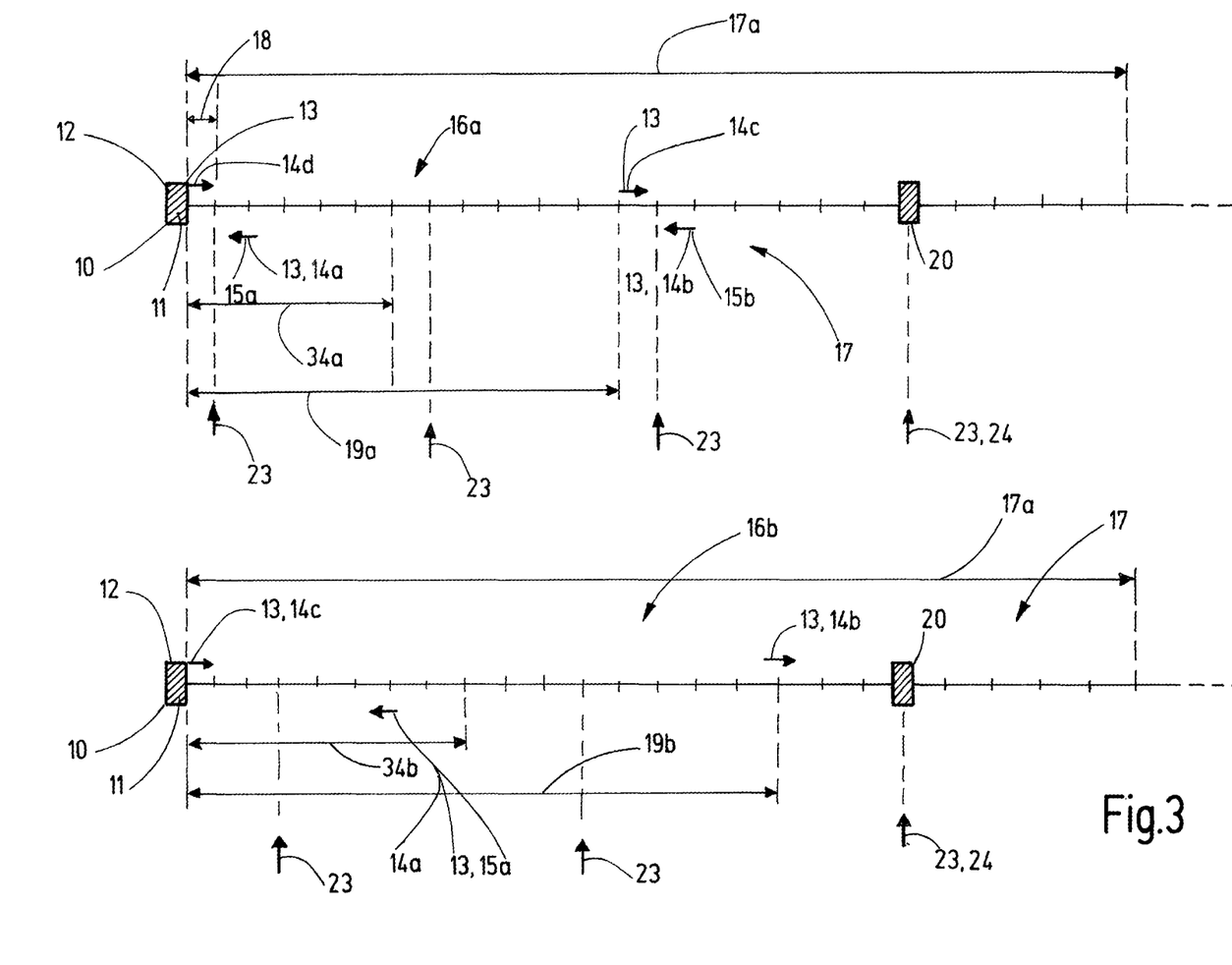
FIG. 3: a schematic illustration of a method according to the invention with regard to emitting a first subset and a second subset of measurement pulses.

In FIG. 3, a schematic illustration of a method (100) according to the invention is shown with regard to emitting a first subset (16a) and a second subset (16b) of measurement pulses (13). Thereby, the illustration is analogous to FIG. 1. That means that, for example, a distance unit corresponds to the distance that a measurement pulse has travelled after to a time unit.

In the upper half of FIG. 3, preferably by means of a device (10) according to the invention, comprising a receiving unit (11) and a transmitting unit (12), a first subset (16a) of measurement pulses (13) is emitted. From this first subset (16a), four measurement pulses (13) can be seen in the upper half of the image of the FIG. 3. The first subset (16) can, however, comprise a plurality of measurement pulses, which have been emitted or will be emitted before and/or after transmitting the measurement pulses shown in the upper half of the image.

The measurement pulses (13) of the first subset (16a) have a first constant pulse interval (19a), which corresponds to twelve distance units. This can be seen by the fact that adjacent measurement pulses are shown twelve distance units (18) apart from each other. In detail, when emitting the fourth emitted measurement pulse (14d), the third measurement pulse (14c) is already twelve distance units (18) away. Furthermore, the first emitted measurement pulse (14a), which has already been reflected on an object (20) and thereby shows a first reflected measurement pulse (15a), is 36 distance units away from the fourth emitted measurement pulse (14d). The second emitted measurement pulse (14b), which has also already been reflected on the object (20) and shows the second reflected measurement pulse (15b) is 24 distance units away from the fourth emitted measurement pulse (14d).

The corresponding partial distance, here, the first partial distance (34a), which can be associated with the first constant pulse interval (19a), corresponds to 6 distance units.

The object (20) is located within a measurement range (17), i.e. within the length (17a) of the measurement range. Here, the length (17a) of the measurement range (17) is 24 distance units (18). The object (20) is within this length (17a) and that being 19 distance units (18) away from the device (10).

When evaluating the information obtained by means of the first subset (16a), four possible object positions (23) are obtained, each at a possible distance of one, seven, 13 and 19 distance units (18) from the device (10). The a possible object position (23) at a distance of one distance unit (18) from the device (10) e.g. results if the first reflected measurement pulse (15a) is associated with the fourth emitted measurement pulse (14d). The possible object positions (23) are at a distance from each other corresponding to the half first constant pulse interval (19a), i.e. the first partial distance (34a).

The actual object position (24) of the object (20) cannot be determined unambiguously from the emittance of the first subset (16a) alone. This results in so-called ghost objects of the object at all possible object positions (23) that do not correspond to the actual object position (24). Only the first subset (16a) cannot distinguish between these possible object positions (23) and the actual object position (24).

In the lower half of the image of FIG. 3, the emitting of a second subset (16b) of measurement pulses (13) is shown. Thereby, three measurement pulses (13) of the second subset (16b) are shown, a first emitted measurement pulse (14a), a second emitted measurement pulse (14b) as well as a third emitted measurement pulse (14c), which has been reflected and thereby, shows a first reflected measurement pulse (15a). Analogous to the first subset (16a), the second subset (16b) can comprise a plurality of measurement pulses, which have been emitted or will be emitted before and/or after transmitting the measurement pulses shown in the lower half of the image.

At the point in time illustrated in the lower half of FIG. 3, the first emitted measurement pulse (14a), which has already been reflected on object (20), is six distance units (18) away from the device (10), while the second emitted measurement pulse (14b) is three distance units (18) from the object and a third emitted measurement pulse (14c) is in the process of being emitted. Analogous to the upper half of the image in FIG. 3, the object (20) is located 19 distance units (18) away from the device (10) for carrying out the method (100). The second constant pulse interval (19b) of the second subset (16b) is 16 distance units, in the lower half of the image of FIG. 3 visible as 16 distance units (18) between two adjacent measurement pulses. The second partial distance (34b) associated with the second constant pulse interval (19b) is eight distance units.

From information obtained by means of the second subset (16b), it can be inferred that the object (20) can be located on three different possible object positions (23) and that being at a distance of 3, 11 and 19 distance units away from the device (10). For example, at the point in time shown in the lower half of the image of FIG. 3, the first emitted measurement pulse (14a) is received six time units after emitting the third emitted measurement pulse (14c). Thereby, the method concludes that the object (20) could possibly be three distance units (18) in front of the device (10). The possible object positions (23) are arranged at a distance from each other corresponding to the half second constant pulse interval (19b), i.e. the first partial distance (34b).

The least common multiple of the constant pulse intervals, namely the numbers 12 and 16, is 48, i.e. 48 distance units, which corresponds to twice the length (17a) of the measuring window, which is 24 distance units.

FIG. 3 shows that when emitting a single subset of measurement pulses that have a constant pulse interval that is less than twice the length (17a) of the measurement range (17); ghost objects also occur at possible object positions (23). If only a single subset is emitted accordingly, clearly determining the actual object position (24) is still not possible.

However, from FIG. 3, it is also clear that the actual object position (24) can be clearly determined by combining the emitting of the shown subsets. It is evident that for each subset, possible object positions arise, wherein a single possible object position (23) has only been determined at the actual object position (24) both by means of the first subset (16a), as well as by means of the second subset (16b). The other possible object positions (23) of the first subset (16a) are not confirmed by the second subset (16b). The same applies to the other possible object positions of the second subset (16b), which are also not confirmed. It can thus be concluded that the object (20) can only be at the actual object position (24).

Figure 4:
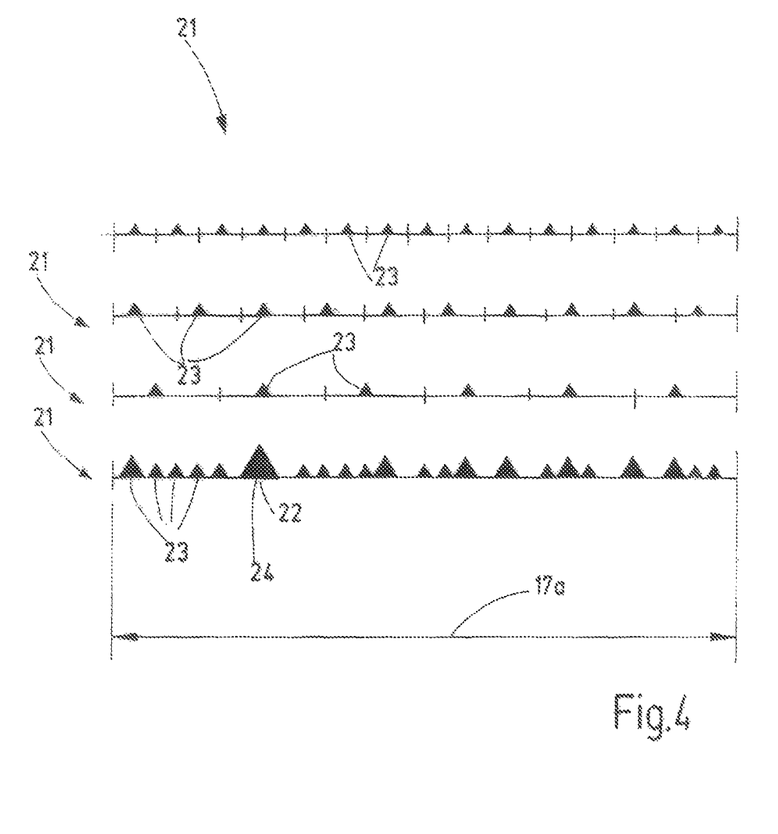
FIG. 4: histogram for extracting the actual object position.

FIG. 4 shows different histograms (21) for extracting (107) the actual object position (24). The histograms (21) extend along the length (17a) of a measurement range (17).

In the first row of FIG. 4, possible object positions (23) are shown when emitting a first subset (16a) of measurement pulses (13), while the second row of FIG. 4 shows possible object positions (23) that are obtained when a second subset (16b) of pulses (13) is emitted. In the third row from above, possible object positions (23) are shown when emitting out a third subset of measurement pulses (13). At each possible object position (23), an "event" is entered, these are depicted as peaks in the histograms. Thereby, for each subset of measurement pulses, a separate histogram can be created, whereby the actual object position (24) cannot be determined from these individual histograms.

In the last row of FIG. 4, a histogram (21) can be seen, in which the previously described individual histograms, which can be associated with the subsets, have been accumulated, i.e. have been added up. While the peaks only have a single height in the individual histograms for the various subsets, peaks that occur at the same point within a plurality of histograms for the subsets become larger in the lowest row in FIG. 4 due to accumulation. For example, the first peak in the bottom row of FIG. 4 has a two-fold height since a possible object position has been detected in both the histogram for the first subset as well as in the histogram for the second subset at that particular location. It becomes evident that a three-fold overlap, meaning a peak with a three-fold height, only results at the actual object position (24).

All other peaks have a single height, representing simple ghost objects, or a double height, thereby representing two-fold ghost objects. However, they can be distinguished from the actual object position (24) because it is the maximum of the histogram (21). Thus, the actual object position (24) can be extracted from the histogram (21) in an easy way.

FIG. 5 shows a perspective view of two measurement ranges, namely a first measurement range (25a) and a second measurement range (25b).

Furthermore, FIG. 5 shows a device (10) for carrying out a method according to the invention (100). The first measurement range (25a) extends from the device (10) in the radiation propagation direction (33). The radiation propagation direction (33) for a point in a measurement range results due to the flat formation of a transmitting unit of the device (10) preferably by connecting the point with an imaginary origin (32), which is behind the device (10). The origin (32) is used to illustrate a position of a single radiation source as opposed to a variety of transmitting elements such as that of a transmitting unit.

The first measurement range (25a) extends from a first beginning range (30a) located directly on the device (10) to a first end range (31a). This results in at least one first length (28a) of the first measurement range (25a) results. Furthermore, it results in an improved second length (28b). Both lengths (28a, 28b) can correspond to each other for a symmetrically formed first measurement range (25a).

The first measurement range (25a) is thus defined on one side by its lengths (25a, 25b) in the radiation propagation direction. These lengths define a first distance range (27a), which is covered by the first measurement range (25a). More precisely, distances to the device from the first beginning range (30a) to the first end range (31a) are covered.

Furthermore, the first measurement range (25) is defined by a field of view (26). The field of view (26) is spanned into two planes by two angle sectors (26a, 26b). Thereby, the first measurement range (25a) takes on a pyramid-like shape altogether, wherein the pyramid does not have a peak due to the flat design of a transmitting unit of the device (10), but abuts the surface of the transmitting unit. Strictly speaking, it is therefore a truncated pyramid, wherein its base surface is curved within the first end range (31a).

Furthermore, in FIG. 5, a much smaller second measurement range (25b) in comparison to the first measurement range (25a) is shown, which is defined by the same field of view (26). However, the second distance range (27b) of the second measurement range (25b) is severely limited. The second measurement range (25b) has a second beginning range (30b) and a second end range (31b).

The second beginning range (30a) is not arranged directly at the device (10), but at a distance to it. The second end range (31b) is not arranged at the first end range (31a) but significantly closer to the device (10) in comparison to it. The second measurement range (25b) is a subrange of the first measurement range (25a) by selecting a significantly smaller distance range, namely the second distance range (27b).

Starting from the second beginning range (30b) up to the second end range (31b), the second measurement range (25b) comprises a first length (29a) as well as a second length (29b). The second measurement range (25b) is thus formed as a truncated pyramid with a curved base surface and a curved cover surface.

What is claimed is:

1. A method for optical distance measurement,
   wherein the method comprises emitting a plurality of measurement pulses, the reflection of emitted measurement pulses on at least one object within a measurement range with a length and receiving reflected measurement pulses,
   wherein N subsets of measurement pulses are emitted,
   wherein each subset comprises a constant pulse interval,
   wherein the constant pulse interval of the different subsets is different,
   wherein the least common multiple of constant pulse intervals of the N subsets corresponds to at least twice the length of the measurement range.

2. The method of claim 1, wherein the constant pulse intervals are each less than twice the length of the measurement range.

3. The method of claim 1, wherein the method comprises determining possible object positions for each reflected and received measurement pulse, and an accumulation of all possible object positions in a histogram.

4. The method of claim 3, wherein the method comprises the extraction of the actual object position from the histogram.

5. The method of claim 1, wherein the least common multiple for all pairs of constant pulse intervals of the N subsets corresponds to at least twice the length of the measurement range.

6. The method of claim 1, wherein the constant pulse intervals are coprime.

7. The method of claim 1, wherein the measurement range is a maximum measurement range or a subrange of the maximum measurement range, especially a focus range.

8. The method of claim 1, wherein the length of the measurement range is a maximum of 1000 m, preferably a maximum of 800 m, most preferably a maximum of 600 m.

9. The method of claim 1, wherein the length of the measurement range is a minimum of 1 m, furthermore, preferably, a minimum of 5 m, most preferably a minimum of 20 m.

10. The method of claim 1, wherein the product of each pair of constant pulse intervals corresponds to at least twice the length of the measurement range.

11. The method of claim 1, wherein the product of all constant pulse intervals corresponds to at least twice the length of the measurement range.

12. The method of claim 1, wherein the measurement pulses have a pulse width, wherein the constant pulse intervals are selected in such a way that every constant pulse interval corresponds to a multiple of the pulse width.

13. A device for optical distance measurement,
   wherein the device is designed as a LIDAR sensor and comprises a transmitting unit for transmitting measurement pulses and a receiving unit for receiving reflected measurement pulses, wherein the device is designed to carry out a method for optical distance measurement,
   wherein the method comprises emitting a plurality of measurement pulses, the reflection of emitted measurement pulses on at least one object within a measurement range with a length and receiving reflected measurement pulses,
   wherein N subsets of measurement pulses are emitted,
   wherein each subset comprises a constant pulse interval,
   wherein the constant pulse interval of the different subsets is different,
   wherein the least common multiple of constant pulse intervals of the N subsets corresponds to at least twice the length of the measurement range.

14. A computer program product, which comprises a computer-readable storage medium, on which a program is saved, which makes it possible for a computer to carry out a method in accordance with claim 1 after it has been loaded into the storage system of the computer.

15. A computer-readable storage medium, on which a program is saved, which makes it possible for a computer to carry out a method in accordance with claim 1 after it has been loaded into the storage system of the computer.

* * * * *